(12) United States Patent
Kadlec et al.

(10) Patent No.: US 8,053,517 B2
(45) Date of Patent: Nov. 8, 2011

(54) STABILIZED ELASTOMER DISPERSIONS

(75) Inventors: Donald Anthony Kadlec, Midland, MI (US); Victor Albert Raul, Midland, MI (US); William James Schulz, Jr., Midland, MI (US)

(73) Assignee: Dow Corning Corporation, Midland, MI (US)

( * ) Notice: Subject to any disclaimer, the term of this patent is extended or adjusted under 35 U.S.C. 154(b) by 62 days.

(21) Appl. No.: 12/521,330

(22) PCT Filed: Jan. 8, 2008

(86) PCT No.: PCT/US2008/000313
§ 371 (c)(1),
(2), (4) Date: Nov. 30, 2009

(87) PCT Pub. No.: WO2008/100364
PCT Pub. Date: Aug. 21, 2008

(65) Prior Publication Data
US 2010/0137470 A1      Jun. 3, 2010

Related U.S. Application Data

(60) Provisional application No. 60/901,578, filed on Feb. 14, 2007.

(51) Int. Cl.
*C08F 283/12* (2006.01)
(52) U.S. Cl. ........................ 524/730; 524/588
(58) Field of Classification Search ................... 524/730, 524/588
See application file for complete search history.

(56) References Cited

U.S. PATENT DOCUMENTS

| | | |
|---|---|---|
| 3,419,593 A | 12/1968 | Willing |
| 3,715,334 A | 2/1973 | Karstedt |
| 3,814,730 A | 6/1974 | Karstedt |
| 3,923,705 A | 12/1975 | Smith |
| 5,654,362 A | 8/1997 | Schulz, Jr. et al. |
| 5,811,487 A | 9/1998 | Schulz, Jr. et al. |
| 5,929,164 A | 7/1999 | Zhang |
| 5,977,280 A | 11/1999 | Kadlec et al. |
| 6,200,581 B1 | 3/2001 | Lin et al. |
| 6,576,623 B1 | 6/2003 | Nakanishi et al. |
| 2002/0102225 A1 | 8/2002 | Hess et al. |
| 2003/0143408 A1 | 7/2003 | Benayoun et al. |
| 2003/0199631 A1 | 10/2003 | Itagaki et al. |
| 2005/0119406 A1 | 6/2005 | Duffy et al. |
| 2006/0034875 A1 | 2/2006 | Nakanishi et al. |

FOREIGN PATENT DOCUMENTS

| | | |
|---|---|---|
| EP | 1072627 | 3/2003 |
| EP | 1550687 | 7/2005 |

*Primary Examiner* — Edward Cain
(74) *Attorney, Agent, or Firm* — Sharon K. Brady

(57) ABSTRACT

This invention pertains to neutralized silicone elastomer dispersions and methods for making neutralized silicone elastomer dispersions. This invention also pertains to compositions comprising the neutralized silicone elastomer and an acid reactive compound. The silicone elastomer dispersion are neutralized typically by blending the silicone elastomer dispersion with a base such as sodium bicarbonate or by adding a basic neutralizing agent to one or more of the raw materials used to make the silicone elastomer dispersion and removing the basic neutralizing agent by filtration or any other suitable means.

10 Claims, No Drawings

STABILIZED ELASTOMER DISPERSIONS

CROSS REFERENCE TO RELATED APPLICATIONS

This application is a U.S. national stage filing under 35 U.S.C. §371 of PCT Application No. PCT/US08/00313 filed on 8 Jan. 2008, currently pending, which claims the benefit of U.S. Provisional Patent Application No. 60/901,578 filed 14 Feb. 2007 under 35 U.S.C. §119 (e). PCT Application No. PCT/US08/00313 and U.S. Provisional Patent Application No. 60/901,578 are hereby incorporated by reference.

BACKGROUND OF THE INVENTION

Silicone elastomer dispersions have found a wide use in the cosmetic and pharmaceutical compositions. However, many of the cosmetic and pharmaceutical actives in these compositions degrade when exposed to acidic materials. Many of these actives are added into the composition in such small quantities that the presence of any acid can cause the degradation and ineffectiveness of a significant portion of the ingredient. It has been found that some silicone elastomers dispersions may contain low, almost undetectable, levels of acid. Therefore it is desirable to use a neutralized elastomer dispersion in these cosmetic and pharmaceutical compositions.

BRIEF SUMMARY OF THE INVENTION

This invention pertains to neutralized silicone elastomer dispersions and methods for making neutralized silicone elastomer dispersions. This invention also pertains to compositions comprising the neutralized silicone elastomer and an acid reactive compound. The silicone elastomer dispersion are neutralized typically by blending the silicone elastomer dispersion with a base such as sodium bicarbonate or by adding a basic neutralizing agent to one or more of the raw materials used to make the silicone elastomer dispersion and removing the basic neutralizing agent by filtration or any other suitable means. Typically the neutralization takes place prior to the addition of an acid reactive compound. The neutralization prevents the degradation and loss of the acid sensitive compound.

DETAILED DESCRIPTION OF THE INVENTION

Neutralized silicone elastomer dispersions useful herein are prepared by adding a basic neutralizing agent to a silicone elastomer dispersion. The neutralizing agent can be added to the elastomer prior to its formation or after its formation in either the gel or paste form. The silicone elastomer dispersions are known in the art and are described in, for example, U.S. Pat. Nos. 5,654,362, 5,811,487 and 6,200,581 herein incorporated by reference for their teaching of silicone elastomers and methods of making.

Many of these silicone elastomer dispersions are commercially available such as (a) a dimethicone/vinyldimethicone crosspolymer composition made by reacting in the presence of a catalyst a polymethylhydrogensiloxane with an alpha, omega-divinylpolydimethyl siloxane for which the dimethicone/vinyldimethicone crosspolymer composition is used at a concentration of 4-10% in cyclomethicone (i.e. KSG-15 silicone elastomer dispersion from Shin-Etsu Silicones of America, Akron, Ohio); (b) a cyclomethicone (and) dimethicone crosspolymer made with an SiH containing polysiloxane and an alpha, omega-diene of formula $CH_2=CH(CH_2)_x CH=CH_2$, where x=1-20, to form a gel by crosslinking and addition of SiH across double bonds in the alpha, omega diene, typically with a nonvolatile content of 8-18% in cyclomethicone (for example a D4 or D5 cyclomethicone, (i.e. Dow Corning® 9040 Elastomer Blend from Dow Corning Corporation, Midland, Mich.) with other types of such silicone elastomers dispersions as described in U.S. Pat. No. 5,654,362 incorporated by reference herein.

Particular examples of suitable elastomer dispersions are SFE 167, a cetearyl dimethicone/vinyl dimethicone crosspolymer from GE Silicones (Waterford, N.Y.); SFE168, a cyclomethicone and dimethicone/vinyl dimethicone crosspolymer from GE Silicones; vinyl dimethicone crosspolymers such as those available from Shin Etsu Silicones of America, Akron, Ohio under trade names KSG-15 (cyclomethicone and dimethicone/vinyl dimethicone crosspolymer), KSG-16 (dimethicone and dimethicone/vinyl dimethicone crosspolymer), KSG-17 (cyclomethicone and dimethicone/vinyl dimethicone crosspolymer), KSG-18 (phenyl Dimethicone (and dimethicone/phenyl vinyl dimethicone crosspolymer); and KSG-20 (dimethicone copolyol crosspolymer; dimethicone/vinyl dimethicone crosspolymer from Dow Corning Corporation, Midland, Mich. under trade name Dow Corning 9506 Cosmetic Powder, DC-9040, DC-9041, DC-9045 elastomers in cyclomethicone from Dow Corning; and a mixture of cyclomethicone and stearyl-vinyl/hydromethylsiloxane copolymer available from Grant Industries, Inc., Elmwood Park, N.J.) under the trade name Gransil SR-CYC.

One method in particular for producing the silicone elastomer dispersions comprises a crosslinking reaction between (A) a multi functional SiH containing polysiloxane and (B) an C=C containing reactant such as an alpha, omega-diene in the presence of a platinum catalyst in the presence of (C) a solvent. The elastomers are swollen with the solvent.

One method for making the silicone elastomer dispersion comprises a crosslinking reaction between (A) a multi functional SiH containing polysiloxane and (B) an alpha, omega-diene in the presence of a platinum catalyst in the presence of (C) a solvent as described in U.S. Pat. No. 5,654,362. In this method the SiH containing polysiloxane (A) is represented by compounds of the formula $R_3SiO(R'_2SiO)_a(R''HSiO)_b SiR_3$ designated herein as type $A^1$ and compounds of the formula $HR_2SiO(R'_2SiO)_c SiR_2H$ or formula $HR_2SiO(R'_2SiO)_a (R''HSiO)_b SiR_2H$ designated herein as type $A^2$. In these formulas, R, R', and R'', are alkyl groups with 1-6 carbon atoms; a is 0-250; b is 2-250; and c is 0-250. The molar ratio of compounds $A^2:A^1$ is 0-20, typically 0-5. Typically compounds of types $A^1$ and $A^2$ are both used in the reaction; however, it is possible to successfully conduct the reaction using only compounds.

The alpha, omega-diene (B) is a compound of the formula $CH_2=CH(CH_2)_x CH=CH_2$ where x is 1-20. Representative examples of suitable alpha, omega-dienes for use herein are 1,4-pentadiene; 1,5-hexadiene; 1,6-heptadiene; 1,7-octadiene; 1,8-nonadiene; 1,9-decadiene; 1,11-dodecadiene; 1,13-tetradecadiene; and 1,19-eicosadiene.

The addition and crosslinking reaction requires a catalyst to effect the reaction between the SiH containing polysiloxane and the alpha, omega-diene. Suitable catalysts are Group VIII transition metals, i.e., the noble metals. Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing about one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. The noble metal catalysts are used in amounts from 0.00001-0.5 parts per 100 weight parts of the SiH containing polysiloxane, preferably 0.00001-0.02 parts, most preferably 0.00001-0.002 parts.

The reaction between (A) and (B) is carried out in the presence of a solvent (C). Typically the solvent is a low molecular weight silicone. The phrase low molecular weight silicone is intended to include (Ci) low molecular weight linear and cyclic volatile methyl siloxanes, (Cii) low molecular weight linear and cyclic volatile and non-volatile alkyl and aryl siloxanes, and (Ciii) low molecular weight linear and cyclic functional siloxanes. Typically used are is (Ci) low molecular weight linear and cyclic volatile methyl siloxanes ("VMS").

VMS compounds correspond to the average unit formula $(CH_3)_aSiO_{(4-a)/2}$ in which a has an average value of two to three. The compounds contain siloxane units joined by —Si—O—Si— bonds. Representative units are monofunctional "M" units $(CH_3)_3SiO_{1/2}$ and difunctional "D" units $(CH_3)_2SiO_{2/2}$. The presence of trifunctional "T" units $CH_3SiO_{3/2}$ results in the formation of branched linear or cyclic volatile methyl siloxanes. The presence of tetrafunctional "Q" units $SiO_{4/2}$ results in the formation of branched linear or cyclic volatile methyl siloxanes.

Linear VMS have the formula $(CH_3)_3SiO\{(CH_3)_3SiO\}_ySi(CH_3)_3$. The value of y is 0-5. Cyclic VMS have the formula $\{(CH_3)_2SiO\}_z$. The value of z is 4-6. Typically, these volatile methyl siloxanes have boiling points less than about 250° C. and viscosities of about 0.65-5.0 centistokes (mm²/s). Examples of Linear VMS are hexamethyldisiloxane (MM) octamethyltrisiloxane (MDM) decamethyltetrasiloxane (MD₂M) dodecamethylpentasiloxane tetradecamethylhexasiloxane (MD₄M) and hexadecamethylheptasiloxane (MD₅M).

Examples of cyclic VMS are octamethylcyclotetrasiloxane (D4); decamethylcyclopentasiloxane (D5) and dodecamethylcyclohexasiloxane (D6)

Examples of branched VMS are heptamethyl-3-{(trimethylsilyl)oxy}trisiloxane (M₃T); hexamethyl-3,3,bis{(trimethylsilyl)oxy}trisiloxane (M₄Q); and pentamethyl {(trimethylsilyl)oxy}cyclotrisiloxane (MD₃).

The low molecular weight linear and cyclic volatile and non-volatile alkyl and aryl siloxanes (Cii) include linear polysiloxanes are compounds of the formula $R_3SiO(R_2SiO)_ySiR_3$, and cyclic polysiloxanes are compounds of the formula $(R_2SiO)_z$ where R is an alkyl group of 1-6 carbon atoms, or an aryl group such as phenyl, y has a value of 0-80, typically 0-20 and z has a value of 4-9, typically 4-6. These polysiloxanes have viscosities generally in the range of about 1-100 centistokes (mm²/s). Examples of (Cii) are polydimethylsiloxane, polydiethylsiloxane, polymethylethylsiloxane, polymethylphenylsiloxane, and polydiphenylsiloxane.

Low molecular weight linear and cyclic functional siloxanes (Ciii) can be represented by acrylamide functional siloxane fluids, acrylate functional siloxane fluids, carbinol functional siloxane fluids, chloroalkyl functional siloxane fluids, epoxy functional siloxane fluids, glycol functional siloxane fluids, ketal functional siloxane fluids, methyl ester functional siloxane fluids, perfluoro functional siloxane fluids, and silanol functional siloxanes.

Other types of solvents can swell the silicone elastomer. Thus, a single solvent or a mixture of solvents may be used. Examples of other solvents are those materials used on an industrial scale to dissolve, suspend, or change the physical properties of other materials and include (Civ) organic compounds, (Cv) compounds containing a silicon atom, (Cvi) mixtures of organic compounds, (Cvii) mixtures of compounds containing a silicon atom, or (Cviii) mixtures of organic compounds and compounds containing a silicon atom.

In general, the organic compounds are aromatic hydrocarbons, aliphatic hydrocarbons, alcohols, aldehydes, ketones, amines, esters, ethers, glycols, glycol ethers, alkyl halides, or aromatic halides. Representative of some common organic solvents are alcohols such as methanol, ethanol, 1-propanol, cyclohexanol, benzyl alcohol, 2-octanol, ethylene glycol, propylene glycol, and glycerol; aliphatic hydrocarbons such as pentane, cyclohexane, heptane, VM&P solvent, and mineral spirits; alkyl halides such as chloroform, carbon tetrachloride, perchloroethylene, ethyl chloride, and chlorobenzene; amines such as isopropylamine, cyclohexylamine, ethanolamine, and diethanolamine; aromatic hydrocarbons such as benzene, toluene, ethylbenzene, and xylene; esters such as ethyl acetate, isopropyl acetate, ethyl acetoacetate, amyl acetate, isobutyl isobutyrate, and benzyl acetate; ethers such as ethyl ether, n-butyl ether, tetrahydrofuran, and 1,4-dioxane; glycol ethers such as ethylene glycol monomethyl ether, ethylene glycol monomethyl ether acetate, diethylene glycol monobutyl ether, and propylene glycol monophenyl ether; ketones such as acetone, methyl ethyl ketone, cyclohexanone, diacetone alcohol, methyl amyl ketone, and diisobutyl ketone; petroleum hydrocarbons such as mineral oil, gasoline, naphtha, kerosene, gas oil, heavy oil, and crude oil; lubricating oils such as spindle oil and turbine oil; and fatty oils such as corn oil, soybean oil, olive oil, rape seed oil, cotton seed oil, sardine oil, herring oil, and whale oil.

"Other" miscellaneous organic solvents can also be used, such as acetonitrile, nitromethane, dimethylformamide, trioctyl phosphate, butyrolactone, furfural, pine oil, turpentine, and m-creosol. The solvent used will depend on the application and whether it is pharmaceutically or cosmetically acceptable.

The neutralized silicone elastomer dispersions are produced by combining SiH containing polysiloxane(s), C=C containing reactant, the solvent, and the catalyst; and mixing these ingredients at room temperature until a gel is formed. Heat may be applied to the reaction mixture to speed up the process.

Neutralization can take place prior to, during or after the silicone elastomer dispersion is produced. For example, neutralization may take place prior to the formation of the silicone elastomer dispersion by passing all the reactants through a filter treated with a basic neutralizing agent. Or the basic neutralizing agent may be added directly to the reactant(s) and thereafter removed by, for example, filtration or centrifuge. When neutralization takes place prior to the formation of the silicone elastomer dispersion the basic neutralizing agent must be such that it does not react or complex with any of the reactants.

Neutralization may also take place after the silicone elastomer dispersion is produced. For example, it may be desirable to add small amounts of a basic neutralizing agent such as sodium bicarbonate or cysteine to the silicone elastomer dispersion. Neutralizing after the reaction may take place with the silicone elastomer dispersion in the gel form or after further processing of the gel into a paste. Typically 0.001 to 1.0 wt % based on the weight of the silicone elastomer dispersion of neutralizing agent is added to the silicone elastomer dispersion. Alternatively 0.01 to 0.1 wt % of the neutralizing agent is used.

Typically, the neutralized silicone elastomer dispersions are produced using a 1:1 molar ratio of SiH containing polysiloxane and C=C containing reactant. It is expected that useful materials may also be prepared by carrying out the process with an excess of the SiH containing polysiloxane or the C=C containing reactant, but this would be considered a less efficient use of the materials. The remainder of the composition comprises the low molecular weight silicone or other solvent in amounts generally within the range of about 65-98 percent by weight of the composition, preferably about 80-98 percent by weight.

Additional amounts of the low molecular weight silicone or solvent can be added to the gel, and the resulting mixture is subjected to shear force to form a paste. Any type of mixing and shearing equipment may be used to perform these steps such as a batch mixer, planetary mixer, single or multiple screw extruder, dynamic or static mixer, colloid mill, homogenizer, sonolator, or a combination thereof.

Other ingredients such as those that complex residual platinum may be added to the silicone elastomer dispersion. These ingredients are taught in U.S. Pat. Nos. 5,977,280 and 5,929,164 herein incorporated by reference. Additionally, it might be desirable to use ingredients that can complex residual platinum and also produce by-products that can act to neutralize the acid.

The neutralized silicone elastomer dispersions are useful in pharmaceutical and cosmetic applications where an acid sensitive active is used. Typically the acid sensitive active is added in amount of 0.001 to 5 wt % based on the weight of the silicone elastomer dispersion. Typically the acid sensitive active is mixed in with the silicone elastomer dispersions using common mixing techniques.

Other ingredients may be added to the neutralized silicone elastomer dispersion and acid sensitive active to make the composition suitable for use. For example, the pharmaceutical or cosmetic composition may be in the form of a liquid, paste, gel, cream, or lotion and appropriate ingredients may be added to maintain the neutralized silicone elastomer dispersion/acid sensitive active in that form.

EXAMPLES

The following examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All weights are given parts per 100 parts in the composition. Stability is the loss of Active as measured by chromatography.

Sample Preparation.

In the following examples the samples were prepared by adding the solvent for the actives into the reaction vessel. To the solvent added Active 1, Active 2 and preservative. The mixture was stirred until all of the solids appeared dissolved. The cyclomethicone, elastomer dispersion and sodium bicarbonate were combined and the active mixture was added to this combination. If cysteine was being added to mixtures, the cysteine was added into ethanol and mixed appropriately with the elastomer dispersion. The amounts of the ingredients are given in the tables.

Summary of Results.

Table 1 shows the % Active loss when no neutralizing agent is present, when only sodium bicarbonate is used, when only cysteine is used and when a combination of cysteine and sodium bicarbonate are used. Differing lots of silicone elastomer dispersion were used in the comparative examples (C2-C7). In Example C1 no silicone elastomer dispersion was used to verify if the loss of active was related to the presence of the silicone elastomer dispersion.

Table 2 shows the results of the time of mixing has on the loss of active.

In Table 3 the components used in formulating the silicone elastomer dispersion were mixed with the actives to determine if the reactant groups on the components (i.e. residual SiH or C=C) were causing the loss of active.

Table 4 demonstrates that the basic neutralizing agent may require an equilibrium time period before adding the active solution to the silicone elastomer dispersion.

Table 5 shows the results of a study that was carried out to confirm that residual acid in some capacity is responsible for the degradation of the actives. In C18 a commercially available form of the silicone elastomer dispersion was used. In C19 the silicone elastomer dispersion was filtered prior to its use. In C20 the silicone elastomer dispersion was an AlSOP filtered elastomer. In C21 the silicone elastomer dispersion was an AlSOP filtered elastomer plus 5 wt % MgSO$_4$ was added. In C22 the silicone elastomer dispersion was an AlSOP filtered elastomer plus 5 wt % NaHCO$_3$ was added. In C23 the silicone elastomer dispersion was an AlSOP filtered elastomer plus 5 wt % MgSO$_4$ and 5 wt % NaHCO$_3$ were added. In Example C24 cyclomethicone 5NF was used in place of the silicone elastomer dispersion.

TABLE 1

| | % Loss of Active. | | | | | | | | | | |
|---|---|---|---|---|---|---|---|---|---|---|---|
| EXAMPLE | 1 | 2 | 3 | 4 | C1 | C2 | C3 | C4 | C5 | C6 | C7 |
| Solvent for Active | 6.0 | 6.0 | 6.0 | 6.0 | 6.0 | 6.0 | 6.0 | 6.0 | 6.0 | 6.0 | 6.0 |
| Active 1 | 0.0003 | 0.0003 | 0.0003 | 0.0003 | 0.0003 | 0.0003 | 0.0003 | 0.0003 | 0.0003 | 0.0003 | 0.0003 |
| Active 2 | 0.05 | 0.05 | 0.05 | 0.05 | 0.05 | 0.05 | 0.05 | 0.05 | 0.05 | 0.05 | 0.05 |
| PRESERVATIVE | 0.04 | 0.04 | 0.04 | 0.04 | 0.04 | 0.04 | 0.04 | 0.04 | 0.04 | 0.04 | 0.04 |
| Cyclomethicone 5NF | 9.0 | 9.0 | 9.0 | 8.5 | 93.91 | 9.0 | 9.0 | 9.0 | 9.0 | 9.0 | 9 |
| Ethanol (from cysteine) | 2.0 | | | 2.0 | | | | | | | |
| Cysteine | 0.001 | | | 0.001 | | | | | | | |
| Sodium Bicarbonate | | 0.03 | 0.006 | 0.03 | | | | | | | |

TABLE 1-continued

% Loss of Active.

| EXAMPLE | 1 | 2 | 3 | 4 | C1 | C2 | C3 | C4 | C5 | C6 | C7 |
|---|---|---|---|---|---|---|---|---|---|---|---|
| 9040 Elastomer | 82.91 | 84.88 | 84.9 | 82.88 | | 84.91 | 84.91 | 84.91 | 84.91 | 84.91 | 84.91 |
| Dental Mixer Time (seconds) | 26 | 26 | 26 | 26 | | | | | | | |
| Stability (125 days) | 49.9 | 0 | 0 | 0 | 0 | 66.6 | 100 | 87.7 | 57.8 | 100 | 28.9 |

TABLE 2

Mixing Study

| Example | 5 | 6 | C8 | C9 |
|---|---|---|---|---|
| Solvent for Active | 6.0 | 6.0 | 6.0 | 6.0 |
| Active 1 | 0.0003 | 0.0003 | 0.0003 | 0.0003 |
| Active 2 | 0.05 | 0.05 | 0.05 | 0.05 |
| PRESERVATIVE | 0.04 | 0.04 | 0.04 | 0.04 |
| Cyclomethicone 5NF | 9.0 | 9.0 | 9.0 | 9.0 |
| Ethanol (from cysteine) | 2.0 | 2.0 | 2.0 | 2.0 |
| Cysteine | 0.001 | 0.001 | 0.001 | 0.001 |
| Sodium Bicarbonate | | 0.03 | | |
| 9040 Elastomer | 82.91 | 82.88 | 82.91 | 82.91 |
| Dental Mixer Time (seconds) | 26 | 26 | 52 | 78 |
| Stability (69 days) | 15.6 | 0 | 31.1 | 20.0 |

TABLE 3

Study of components in Elastomer

| Example | C9 | C10 | C11 |
|---|---|---|---|
| Solvent for Active | 6.0 | 6.0 | 6.0 |
| Active 1 | 0.0003 | 0.0003 | 0.0003 |
| Active 2 | 0.05 | 0.05 | 0.05 |
| PRESERVATIVE | 0.04 | 0.04 | 0.04 |
| ST-Cyclomethicone 5-NF | 9.0 | 9.0 | 9.0 |
| | 72.92 | 79.32 | 68.52 |
| SiH | 10.8 | | 10.8 |
| Pt | 1.19 | 1.19 | 1.19 |
| Vi Compound | 0 | 4.4 | 4.4 |
| Stability (145 Days) | 8.9 | 0 | 4.4 |

TABLE 4

Stabilization Study

| EXAMPLE | 7 | 8 | 9 | 10 | C12 | C13 | C14 | C15 | C16 | C17 |
|---|---|---|---|---|---|---|---|---|---|---|
| Solvent for Active | 6.0 | 6.0 | 6.0 | 6.0 | 6.0 | 6.0 | 6.0 | 6.0 | 6.0 | 6.0 |
| Active 1 | 0.0003 | 0.0003 | 0.0003 | 0.0003 | 0.0003 | 0.0003 | 0.0003 | 0.0003 | 0.0003 | 0.0003 |
| Active 2 | 0.05 | 0.05 | 0.05 | 0.05 | 0.05 | 0.05 | 0.05 | 0.05 | 0.05 | 0.05 |
| PRESERVATIVE | 0.04 | 0.04 | 0.04 | 0.04 | 0.04 | 0.04 | 0.04 | 0.04 | 0.04 | 0.04 |
| Cyclomethicone 5NF | 9.0 | 9.0 | 9.0 | 9.0 | 9.0 | 9.0 | 9.0 | 9.0 | 9.0 | 9.0 |
| Ethanol (from cysteine) | 2.0 | | | 2.0 | | | | | | |
| Cysteine | 0.001 | | | 0.001 | | | | | | |
| Sodium Bicarbonate | | 0.03 | 0.006 | 0.03 | 0.03 | 0.03 | 0.03 | 0.03 | 0.03 | 0.03 |
| 9040 Elastomer | 82.91 | 84.88 | 84.9 | 82.88 | 84.88 | 84.88 | 84.88 | 84.88 | 84.88 | 84.88 |
| Dental Mixer Time (seconds) | 26 | 26 | 26 | 26 | 26 | 26 | 26 | 26 | 26 | 26 |
| Stability (118 days) | 20 | 0 | 0 | 0 | | | | | | |
| Stability (86 days) | | | | | 2.2 | 6.7 | 3.2 | 0 | 8.9 | 0 |

TABLE 5

Study to confirm residual acid is responsible for degradation.

| EXAMPLE | C18 | C19 | C20 | C21 | C22 | C23 | C24 |
|---|---|---|---|---|---|---|---|
| Solvent for Active | 6.0 | 6.0 | 6.0 | 6.0 | 6.0 | 6.0 | 6.0 |
| Active 1 | 0.0003 | 0.0003 | 0.0003 | 0.0003 | 0.0003 | 0.0003 | 0.0003 |
| Active 2 | 0.05 | 0.05 | 0.05 | 0.05 | 0.05 | 0.05 | 0.05 |
| PRESERVATIVE | 0.04 | 0.04 | 0.04 | 0.04 | 0.04 | 0.04 | 0.04 |
| Cyclomethicone 5NF | 9.0 | 9.0 | 9.0 | 9.0 | 9.0 | 9.0 | 9.0 |
| 9040 Elastomer | 84.91 | 84.91 | 84.91 | 84.91 | 84.91 | 84.91 | 0 |
| Cyclomethicone 5NF | | | | | | | 84.91 |
| Stability (7 days) | 17.8 | 5.0 | 5.0 | 6.7 | 8.9 | 13.3 | 2.2 |

That which I claimed is:

1. A neutralized silicone elastomer dispersion produced by adding a 0.001 to 1 wt % based on the weight of the silicone elastomer dispersion of a basic neutralizing agent selected from cysteine or a mixture of cysteine and sodium bicarbonate to the silicone elastomer dispersion.

2. The neutralized silicone elastomer as claimed in claim 1 wherein 0.01 to 0.1 wt % of the basic neutralizing agent is used.

3. A neutralized silicone elastomer dispersion produced by the method comprising reacting (A) a multi functional SiH containing polysiloxane and (B) C=C containing reactant in the presence of a platinum catalyst and in the presence of (C) a solvent, to produce a silicone elastomer dispersion, thereafter adding a 0.001 to 1 wt % based on the weight of the silicone elastomer dispersion of a basic neutralizing agent selected from cysteine or a mixture of cysteine and sodium bicarbonate to silicone elastomer dispersion.

4. The silicone elastomer dispersion as claimed in claim 3 wherein the C=C containing reactant is a alpha, omega diene.

5. The silicone elastomer dispersion as claimed in claim 3 wherein the solvent is a low molecular weight silicone.

6. The neutralized silicone elastomer as claimed in claim 3 wherein 0.01 to 0.1 wt % of the basic neutralizing agent is used.

7. A neutralized silicone elastomer dispersion produced by the method comprising treating a SiH containing polysiloxane with a neutralizing agent selected from cysteine or a mixture of cysteine and sodium bicarbonate; reacting (A) the neutralized SiH containing polysiloxane with (B) C=C containing reactant in the presence of a platinum catalyst and in the presence of (C) a solvent, to produce a silicone elastomer dispersion.

8. The silicone elastomer dispersion as claimed in claim 7 wherein the C=C containing reactant is an alpha, omega diene.

9. The silicone elastomer dispersion as claimed in claim 7 wherein the solvent is a low molecular weight silicone.

10. The neutralized silicone elastomer as claimed in claim 7 wherein 0.01 wt % based on the weight of the silicone elastomer dispersion of the basic neutralizing agent is used.

* * * * *